United States Patent
Shi et al.

(10) Patent No.: US 12,401,259 B2
(45) Date of Patent: Aug. 26, 2025

(54) DIRECT-DRIVE SYSTEM

(71) Applicant: AAC Microtech (Changzhou) Co., Ltd., Changzhou (CN)

(72) Inventors: Weiling Shi, Shenzhen (CN); Yu Qin, Shenzhen (CN); Min Chen, Shenzhen (CN); Xueyuan Zhu, Shenzhen (CN)

(73) Assignee: AAC Microtech (Changzhou) Co., Ltd., Jiangsu (CN)

( * ) Notice: Subject to any disclaimer, the term of this patent is extended or adjusted under 35 U.S.C. 154(b) by 0 days.

(21) Appl. No.: 17/919,535

(22) PCT Filed: Jul. 20, 2022

(86) PCT No.: PCT/CN2022/106636
§ 371 (c)(1),
(2) Date: Oct. 18, 2022

(87) PCT Pub. No.: WO2024/000678
PCT Pub. Date: Apr. 1, 2024

(65) Prior Publication Data
US 2025/0119044 A1  Apr. 10, 2025

(30) Foreign Application Priority Data

Jun. 30, 2022 (CN) .......................... 202221694346.2

(51) Int. Cl.
*H02K 41/03* (2006.01)

(52) U.S. Cl.
CPC .................................. *H02K 41/03* (2013.01)

(58) Field of Classification Search
None
See application file for complete search history.

(56) References Cited

U.S. PATENT DOCUMENTS

2016/0261170 A1* 9/2016 Chuo ................. H02K 9/04
2019/0190366 A1* 6/2019 Urata ................. H02K 41/03

* cited by examiner

*Primary Examiner* — Naishadh N Desai
(74) *Attorney, Agent, or Firm* — Wiersch Law Group

(57) ABSTRACT

A direct-drive system, including a base provided with a guide rail and a stator assembly; and at least one slide spaced from the base and fixed to the base by means of the guide rail. A mover assembly arranged opposite to the stator assembly is fixed to the at least one slide, and the mover assembly interacts with the stator assembly to drive the at least one slide to slide on the guide rail. An orthographic projection of the guide rail onto the base along a sliding direction of the at least one slide falls at least partially at an outer side of the base. The guide rail structure is first contacted when the modules are spliced, so as to ensure smooth sliding of the direct-drive system and reduce the difficulty of assembly and maintenance of the system.

7 Claims, 3 Drawing Sheets

DIRECT-DRIVE SYSTEM

TECHNICAL FIELD

The present invention belongs to the technical field of motors, and in particular, to a direct-drive system.

BACKGROUND

A direct-drive system in the related art is prone to defects such as poor straightness and complex assembly positioning during assembly, which not only reduces production efficiency, but also leads to uneven force of the direct-drive system during operation, affecting the usage performance of the direct-drive system, and leading to inconvenient maintenance of the direct-drive system after assembly.

In addition, the direct-drive system in the related art has an unchanged length, a direct-drive system with a specific length is required to be selected in different applications, and a length of a motor is limited, leading to poor use flexibility and versatility. Therefore, to enable the direct-drive system to have an adjustable length and be easy to assemble and maintain, a modular design has been performed on the existing direct-drive system, and modules are directly spliced to form a system for use. However, at present, the modular design of the direct-drive system still has the following problems: when the modules are spliced, individual parts between the modules may be incompletely spliced, especially when the guide rail cannot be fully contacted, which may lead to deterioration of operation performance of the system.

Therefore, there is a need to provide a new direct-drive system to solve the above technical problems.

SUMMARY

An embodiment of the present invention provides a direct-drive system, including a base provided with a guide rail and a stator assembly; and at least one slide spaced from the base and fixed to the base by means of the guide rail. A mover assembly arranged opposite to the stator assembly is fixed to the at least one slide, and the mover assembly interacts with the stator assembly to drive the at least one slide to slide on the guide rail. In a sliding direction of the at least one slide, the length of the guide rail is greater than the length of the base.

As an improvement, the base includes a bottom plate, and the guide rail includes a mounting portion arranged at an inner surface of the bottom plate and a splicing portion extending from the mounting portion along the sliding direction of the at least one slide to outside of the bottom plate.

As an improvement, the at least one slide includes multiple slides, and each of the multiple slides is slidably mounted to the guide rail through the splicing portion.

As an improvement, the base further includes a top plate arranged opposite to and spaced from the bottom plate, the stator assembly includes a first magnetic conductor arranged at a side of the top plate close to the bottom plate, and coils fixed to the first magnetic conductor and spaced apart from each other. The mover assembly includes a second magnetic conductor arranged at a side of the slide facing the top plate, and magnets fixed to the second magnetic conductor and spaced apart from each other. The magnets are arranged opposite to and spaced from the coils.

As an improvement, the first magnetic conductor includes a magnetically conductive substrate and teeth arranged at the magnetically conductive substrate, and the coils sleeve the teeth.

As an improvement, at least one slider that is slidable is arranged at a side of the slide facing the bottom plate, and the slide slides on the guide rail by means of the at least one slider.

As an improvement, the at least one slider is symmetrically arranged at two opposite sides of the guide rail along a motion direction of the slide.

As an improvement, the base further includes a side plate connected between the top plate and the bottom plate, the side plate is provided with at least one first position feedback member along the sliding direction of the at least one slide. A second position feedback member is provided at a side of the slide facing the side plate, and the second position feedback member is arranged opposite to and spaced from the at least one first position feedback member.

As an improvement, the at least one first position feedback member includes multiple first position feedback members, and the multiple first position feedback members are arranged at equal intervals on the side plate.

As an improvement, the at least one first position feedback member is a reading head, and the second position feedback member is a scale.

DESCRIPTION OF EMBODIMENTS

Figure 1:
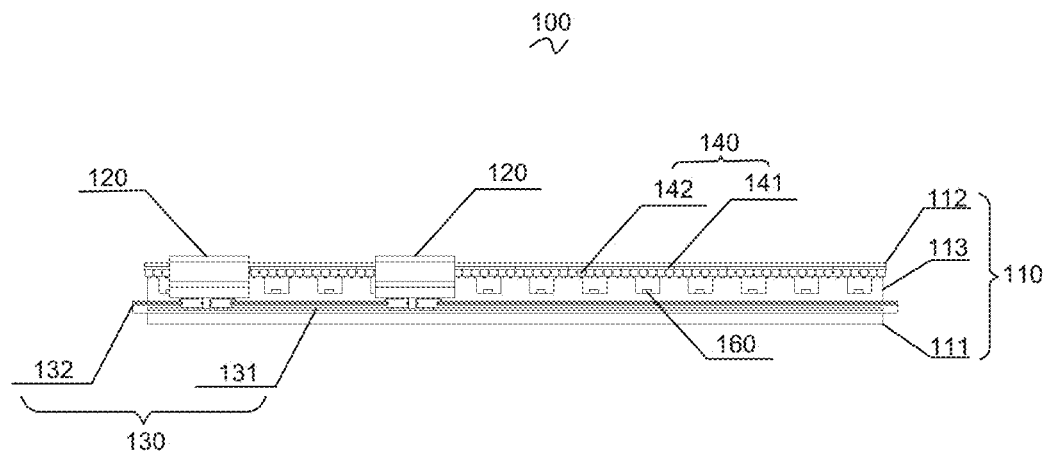
FIG. 1 is a schematic structural diagram of a direct-drive system according to an embodiment of the present invention.
Figure 2:
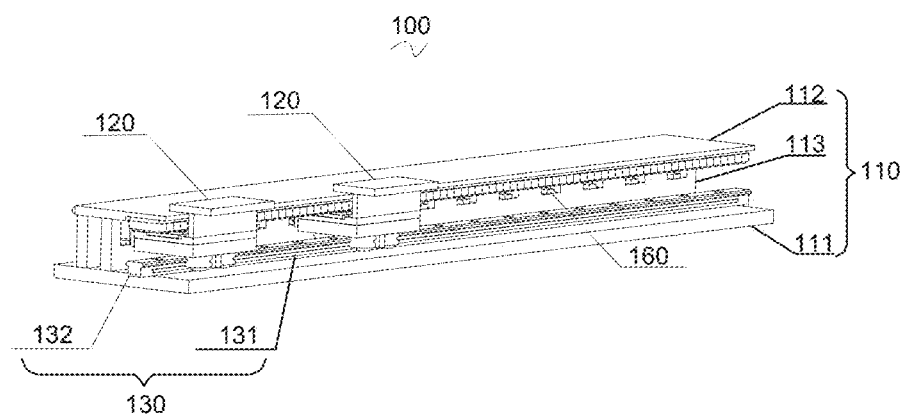
FIG. 2 is a schematic structural diagram of a direct-drive system according to an embodiment of the present invention from another perspective.
Figure 3:
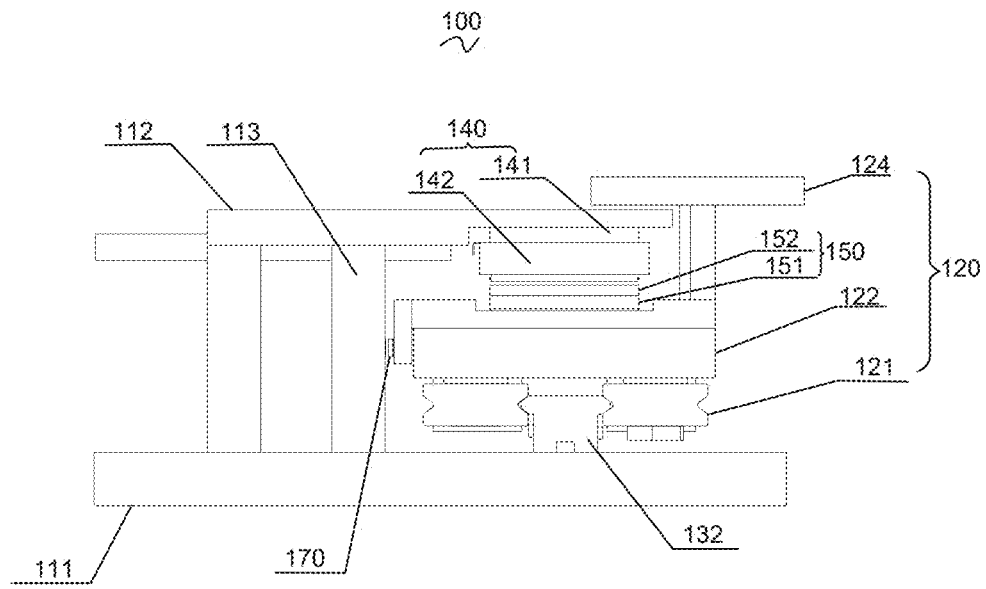
FIG. 3 is a sectional view of a direct-drive system according to an embodiment of the present invention.
Figure 4:
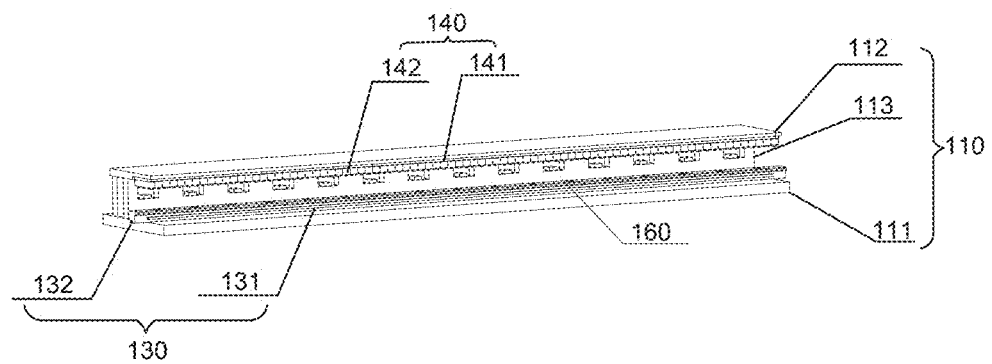
FIG. 4 is a schematic structural diagram of a stator module according to an embodiment of the present invention.

To enable those skilled in the art to better understand the technical solutions of the present invention, the present invention is described in detail below with reference to the accompanying drawings and embodiments.

In some descriptions of the present invention, unless otherwise explicitly specified and limited, the terms "mount", "connect". "couple" or "fix" and other similar terms are not limited to physical or mechanical connections, but may include electrical connections, either directly or indirectly through intermediate media, which may be an internal connection of two elements, or an interaction of two elements. Moreover, the orientation or position relationship indicated by the terms "central", "longitudinal", "transverse", "length", "width", "thickness", "upper", "lower", "front", "back", "left", "right", "vertical", "horizontal", "top", "bottom", "inner", "outer", etc. are based on the orientation or position relationship shown in the accompanying drawings and are merely intended to indicate a relative position relationship. The relative position relationship may be correspondingly changed when an absolute position of a described object is changed.

As shown in FIG. 1 to FIG. 6, an embodiment of the present invention provides a direct-drive system 100, including: a base 110 and at least one slide 120 spaced from the base. The base 110 is provided with a guide rail 130 and a stator assembly 140. A mover assembly 150 that is arranged opposite to the stator assembly 140 is fixed to the slide 120. The mover assembly 150 interacts with the stator assembly 140 to drive the slide 120 to slide on the guide rail 130. In a sliding direction of the at least one slide 120, the length of the guide rail 130 is greater than the length of the base 110.

The base, and the guide rail and the stator assembly that are arranged on the base in this embodiment are equivalent to a stator module. The slide and the mover assembly are equivalent to a mover module. Multiple stator modules are spliced to obtain a direct-drive system with an adjustable length. In addition, in a sliding direction of the at least one slide, the length of the guide rail is greater than the length of the base, so that when the mover and stator modules are spliced, the guide rail is first contacted, which can ensure smooth connection of the guide rail, and other parts are at a slightly larger distance, so that incomplete contact of the guide rail and first contact of other parts will not occur.

It is to be noted that the stator assembly in this embodiment includes a variety of shapes such as a straight line, a circular arc, and a sector, which together constitutes a stator system. This is not limited in this embodiment.

It is to be further noted that each stator module may be provided with a mover module. Certainly, one stator module may also be provided with two, three or more mover modules.

In an example, as shown in FIG. 1 to FIG. 4, the base 110 includes a bottom plate 111, and the guide rail 130 includes a mounting portion 131 arranged at an inner surface of the bottom plate 111 and a splicing portion 132 extending from the mounting portion 131 along the sliding direction of the slide 120 to outside of the bottom plate 111. That is, the splicing portion extends a certain size out of the base to ensure that the guide rail structures are first contacted between the modules.

In some embodiments, the direct-drive system may include multiple slides. The multiple slides are slidably mounted to the guide rail through the splicing portion. In other words, the modules are spliced through the splicing portions, and the slides slide, through the splicing portions, to the guide rail of the stator modules spliced together, and slide relative to each base.

Further, as shown in FIG. 1 to FIG. 6, the base 110 further includes a top plate 112 arranged opposite to and spaced from the bottom plate 111. The stator assembly 140 includes a first magnetic conductor 141 arranged at a side of the top plate 112 close to the bottom plate 111, and multiple coils 142 fixed to the first magnetic conductor 141 and spaced apart from each other. The mover assembly 150 includes a second magnetic conductor 151 arranged at a side of the slide 120 facing the top plate 112, and multiple magnets 152 fixed to the second magnetic conductor 151 and spaced apart from each. The magnets 152 are arranged opposite to the coils 142.

It is to be understood that the coil is further connected to an external power supply, and the coil is energized by an external drive control system connected to the coil. When a current is supplied into the coil, the coil generates a traveling wave magnetic field, the magnet induces a magnetic field, an air-gap magnetic field is generated between the magnet and the coil, and a force is generated between the magnet and the coil to drive the slide to move along the guide rail.

Figure 5:
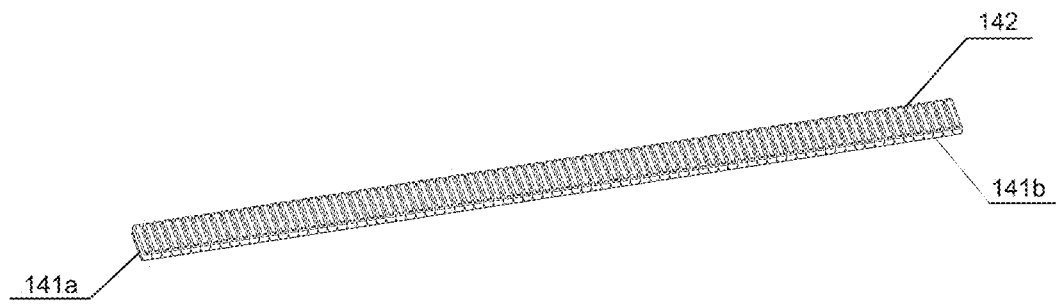
FIG. 5 is a schematic structural diagram of a stator assembly according to an embodiment of the present invention.
Figure 6:
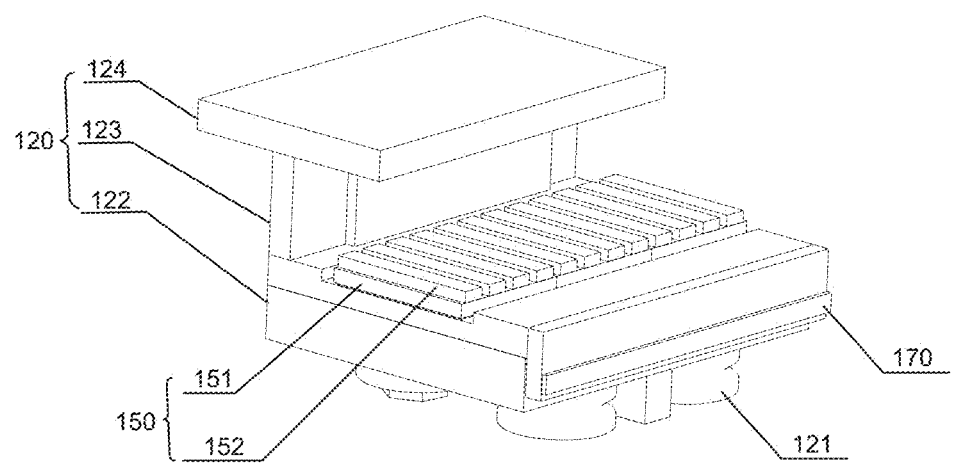
FIG. 6 is a schematic structural diagram of a mover module according to an embodiment of the present invention.

In some optional embodiments, as shown in FIG. 5, the first magnetic conductor 141 includes a magnetically conductive substrate 141a and multiple teeth 141b arranged on the magnetically conductive substrate 141a, and the coils 142 sleeve the teeth 141b.

It is to be noted that the magnet in this embodiment may be first mounted to the second magnetic conductor and then mounted to the slide as a whole.

In some other embodiments, as shown in FIG. 1 to FIG. 4 and FIG. 6, at least one slider 121 that is slidable is arranged at a side of the slide 120 facing the bottom plate 111, and the slide 120 slides on the guide rail 130 b means of the slider 121.

It is to be noted that the structure and the number of the slider in this embodiment are not limited, which may be specifically configured according to the structure of the guide rail. For example, when the guide rail is provided with sliding portions at two sides, two or four sliders may be symmetrically arranged below the slide, so that the slider slides on the sliding portion. In this case, the sliders are symmetrically arranged at two opposite sides of the guide rail along a motion direction of the slide, so that the slide moves more stably.

Further, as shown in FIG. 1 to FIG. 4, the base 110 further includes a side plate 113 connected between the top plate 112 and the bottom plate 111, the side plate 113 is provided with at least one first position feedback member 160 along the sliding direction of the slide 120, a second position feedback member 170 is provided at a side of the slide 120 facing the side plate 113, and the second position feedback member 170 is arranged opposite to and spaced from at least one first position feedback member 160.

In some embodiments, as shown in FIG. 1 to FIG. 4, multiple first position feedback members 160 are provided at equal intervals on the side plate 113.

In some embodiments, the side plate is provided with multiple mounting grooves spaced from each other, and the first position feedback members are arranged in the mounting grooves.

In some embodiments, the first position feedback member may be a scale, and the second position feedback member may be a scale reading head.

The second position feedback member in this embodiment moves synchronously on the slide. When the slide passes the first position feedback member, the first position feedback member can sense position information on the second position feedback member, and transmit position information of the mover module to an external drive control system, so as to realize drive control of the mover assembly.

It is to be noted that this embodiment does not limit the structure of the slide, which may be a combination of a plurality of substructures or a whole structure.

In an example, as shown in FIG. 1 to FIG. 4 and FIG. 6, the slide 120 includes a first plate body 122 arranged opposite to and spaced from the top plate 112, the second magnetic conductor 151 and magnets 152 are arranged at a side of the first plate body 122 facing the top plate 112, the slider 121 is arranged at a side of the first plate body 122 facing the bottom plate 111, and the second position feedback member 170 is arranged at a side of the first plate body 122 facing the side plate 113.

Further, still referring to FIG. 1 to FIG. 4 and FIG. 6, the slide 120 further includes an extension plate 123 extending upward above the top plate 112 from the first plate body 122, and a second plate body 124 connected to the extension plate 123 and arranged opposite to the first plate body 122. That is, the second plate body 124 is arranged above the top plate 112. A force is generated between the stator assembly and the mover assembly to drive the slide to slide relative to the base.

The present invention provides a direct-drive system, which has the following beneficial effects compared with the related art: in a sliding direction of the at least one slide, the length of the guide rail is greater than the length of the base, so that the guide rail structures are first contacted when the mover and stator modules are spliced, so as to ensure smooth sliding of the direct-drive system and reduce the difficulty of assembly and maintenance of the system.

It should be understood that the above embodiments are only exemplary embodiments intended to illustrate the principle of the present invention, but the present invention is not limited thereto. For those of ordinary skill in the art, various variations and improvements can be made without deviating from the spirit and essence of the present invention, and all these variations and improvements shall fall within a scope of the present invention.

What is claimed is:

1. A direct-drive system, comprising
a base provided with a guide rail and a stator assembly; and
at least one slide spaced from the base and fixed to the base by means of the guide rail;
wherein a mover assembly arranged opposite to the stator assembly is fixed to the at least one slide, and the mover assembly interacts with the stator assembly to drive the at least one slide to slide on the guide rail; and
in a sliding direction of the at least one slide, the length of the guide rail is greater than the length of the base;
the base comprises a bottom plate, and the guide rail comprises a mounting portion arranged at an inner surface of the bottom plate and a splicing portion extending from the mounting portion along the sliding direction of the at least one slide to outside of the bottom plate; the at least one slide comprises multiple slides, and each of the multiple slides is slidably mounted to the guide rail through the splicing portion;
the base further comprises a top plate arranged opposite to and spaced from the bottom plate, the stator assembly comprises a first magnetic conductor arranged at a side of the top plate close to the bottom plate, and coils fixed to the first magnetic conductor and spaced apart from each other; and
wherein the mover assembly comprises a second magnetic conductor arranged at a side of the slide facing the top plate, and magnets fixed to the second magnetic conductor and spaced apart from each other; wherein the magnets are arranged opposite to and spaced from the coils.

2. The direct-drive system as described in claim 1, wherein the first magnetic conductor comprises a magnetically conductive substrate and teeth arranged at the magnetically conductive substrate, and the coils sleeve the teeth.

3. The direct-drive system as described in claim 1, wherein at least one slider that is slidable is arranged at a side of the slide facing the bottom plate, and the slide slides on the guide rail by means of the at least one slider.

4. The direct-drive system as described in claim 3, wherein the at least one slider is symmetrically arranged at two opposite sides of the guide rail along a motion direction of the slide.

5. The direct-drive system as described in claim 1, wherein the base further comprises a side plate connected between the top plate and the bottom plate, the side plate is provided with at least one first position feedback member along the sliding direction of the at least one slide; and
a second position feedback member is provided at a side of the slide facing the side plate, and the second position feedback member is arranged opposite to and spaced from the at least one first position feedback member.

6. The direct-drive system as described in claim 5, wherein the at least one first position feedback member comprises multiple first position feedback members, and the multiple first position feedback members are arranged at equal intervals on the side plate.

7. The direct-drive system as described in claim 5, wherein the at least one first position feedback member is a reading head, and the second position feedback member is a scale.

* * * * *